(12) United States Patent
Stevanovski et al.

(10) Patent No.: US 7,653,597 B1
(45) Date of Patent: Jan. 26, 2010

(54) PAYMENT ADMINISTRATION SYSTEM

(76) Inventors: David Stevanovski, 5760 Winkler Mill, Rochester, MI (US) 48307; Ed Cantrell, 27726 Warner, Warren, MI (US) 48092

( * ) Notice: Subject to any disclaimer, the term of this patent is extended or adjusted under 35 U.S.C. 154(b) by 1102 days.

(21) Appl. No.: 09/614,109

(22) Filed: Jul. 12, 2000

Related U.S. Application Data

(60) Provisional application No. 60/143,491, filed on Jul. 12, 1999.

(51) Int. Cl.
*G06Q 40/00* (2006.01)
(52) U.S. Cl. .......................... 705/40; 705/39
(58) Field of Classification Search .................. 705/40, 705/39
See application file for complete search history.

(56) References Cited

U.S. PATENT DOCUMENTS

| | | | | |
|---|---|---|---|---|
| 4,485,300 A | * | 11/1984 | Peirce | 235/380 |
| 5,220,501 A | * | 6/1993 | Lawlor et al. | 364/408 |
| 5,557,518 A | * | 9/1996 | Rosen | 364/408 |
| 5,903,652 A | * | 5/1999 | Mital | 380/25 |
| 5,953,710 A | * | 9/1999 | Fleming | 705/38 |
| 6,014,646 A | * | 1/2000 | Vallee et al. | 705/39 |
| 6,029,150 A | * | 2/2000 | Kravitz | 705/39 |

* cited by examiner

*Primary Examiner*—Daniel S Felten
(74) *Attorney, Agent, or Firm*—Gifford, Krass, Sprinkle, Anderson & Citkowski, P.C.

(57) ABSTRACT

A payment administration system includes a system administrator, customer and merchant interfaces, and a database. The payment administrative system also includes bank interfaces, credit agency interfaces to facilitate automatic, paperless transactions rapidly. The customer is permitted to set a number of purchase and payment parameters, such as hours of use, goods or services category, and daily limits. The payment administration system generates real-time notification of any action occurring on the customer's account and permits continuous monitoring of the status of each transaction in real time.

13 Claims, 6 Drawing Sheets

52

CREATING A CUSTOMER ACCOUNT FILE

62

PROVIDING AN ELECTRONIC LINK BETWEEN THE ADMINISTRATOR AND CUSTOMER

64

NOTIFYING THE CUSTOMER ELECTRONICALLY OF ANY CHANGE IN ACCOUNT STATUS

PAYMENT ADMINISTRATION SYSTEM

This application claims the benefit of U.S. Provisional Application No. 60/143,491, filed Jul. 12, 1999.

BACKGROUND OF THE INVENTION

I. Field of the Invention

The invention relates to an administration system and method for directing payment for financial obligations, and more particularly, to a system and method for electronic payment for purchases using electronic communication.

II. Description of the Prior Art

It is known to make purchases from merchants electronically over the Internet using conventional credit cards. The consumer provides a credit card number to the merchant electronically. The merchant then seeks approval from the credit card company for payment for the purchase. If the consumer is within the credit limits of his account, the credit card company will give the merchant approval for payment and the merchant then completes the transaction with the consumer. The credit card company then pays the merchant and periodically issues a written statement seeking payment from the consumer.

However, there are security and privacy problems with such a system. Anyone having the consumer's credit card number can make a purchase so long as it is within the credit limit of the card. Additionally, conventional charge cards are obtained by using paper forms which often must be delivered by the postal service before a plastic charge card is delivered to the customer. The consumer does not receive notification of the credit transaction or payments to the account until the monthly statement is issued. Because of the multitude of steps and paper documentation required to complete a transaction using either a paper check or conventional charge card, financial institutions, customers and merchants all incur high costs for the convenience of using a check or credit card. Transaction summaries are provided only once a month, thereby creating a substantial time gap if a transaction has been improperly made or improperly entered into the system.

Thus, it would be desirable to have a payment system which is easily usable, secure and provides great flexibility in payment and additional security for the consumer. Additionally, it would be desirable to provide real-time notification of changes in the customers credit account.

SUMMARY OF THE INVENTION

These and other advantages are obtained through a payment administration system providing electronic real-time notification of transactions and customer selected parameters for type of transactions and for payment options. The administrative system includes a central administrator which communicates electronically in real time with a customer, creditor or merchant, consumer's financial institution, and administrator's bank to administrate payments for transactions. The payment system permits the customer to set purchase parameters for making the transaction, choose from several payment options, and to select the timing of real-time notification of activity on the customer's account.

The administrator includes at least one database and several computer programs for administrating the database, making and collecting payments, and directing the communications. The database contains individual files for each customer in which data is entered directly by the customer. The customer enters relevant credit and personal information and selects a payment system such as credit or debit. Additionally, the customer sets purchase parameters. These parameters limit the type of purchases, the category of merchants or creditors with which the account may be used, the time of day, who can use the account, the amounts of the purchases, and payment options. The payment option includes debit or credit and includes the ability to have secondary payment accounts. After a customer file is opened in the administrative database, a credit program verifies banking and financial information and credit information to establish either a credit limit and/or to establish the necessary link with the debit bank or financial institution. If the customer information is acceptable, an account is opened in the database and credit parameters are set. The consumer is notified that the account is active electronically. The customer may then make a purchase or establish a payment mechanism for credit accounts, utilities and the like. The administrator directs payments to the creditors at predetermined times and collects from the customer's account.

The customer may then make a purchase through the system by contacting a participating merchant and providing an account number. The merchant seeks approval for the transaction from the administrator through a merchant interface. The administrator provides either approval for the purchase or denies the purchase. When the purchase is approved, the merchant completes the transaction. The sale is posted to the customer's account by the administrator. A payment program directs payment to the merchant.

The administrative system forwards a real-time transaction receipt to the customer when any transactions occur. The customer may receive daily account statements if desired or view the status of the account at any time. At a pre-selected time each month the administrator closes the customer's account and forwards a monthly statement to the customer electronically, such as by e-mail. If the customer has a credit account, the administrative system electronically withdraws an amount from the customer's financial institution in accordance with the automatic payment option selected by the customer or an amount directed by the customer. If the customer has a debit account, the administrative system obtains payment from the customer's financial institution. If the customer elects, a backup or secondary account, such as a savings or money market account may be provided. In the event that the primary account is unable to cover the payment, payment is automatically withdrawn from the secondary account.

BRIEF DESCRIPTION OF THE DRAWINGS

FIG. 5 is a flow chart showing a first alternative preferred method of administrating payments in accordance with the invention;

DETAILED DESCRIPTION OF THE PREFERRED EMBODIMENTS

Figure 1:
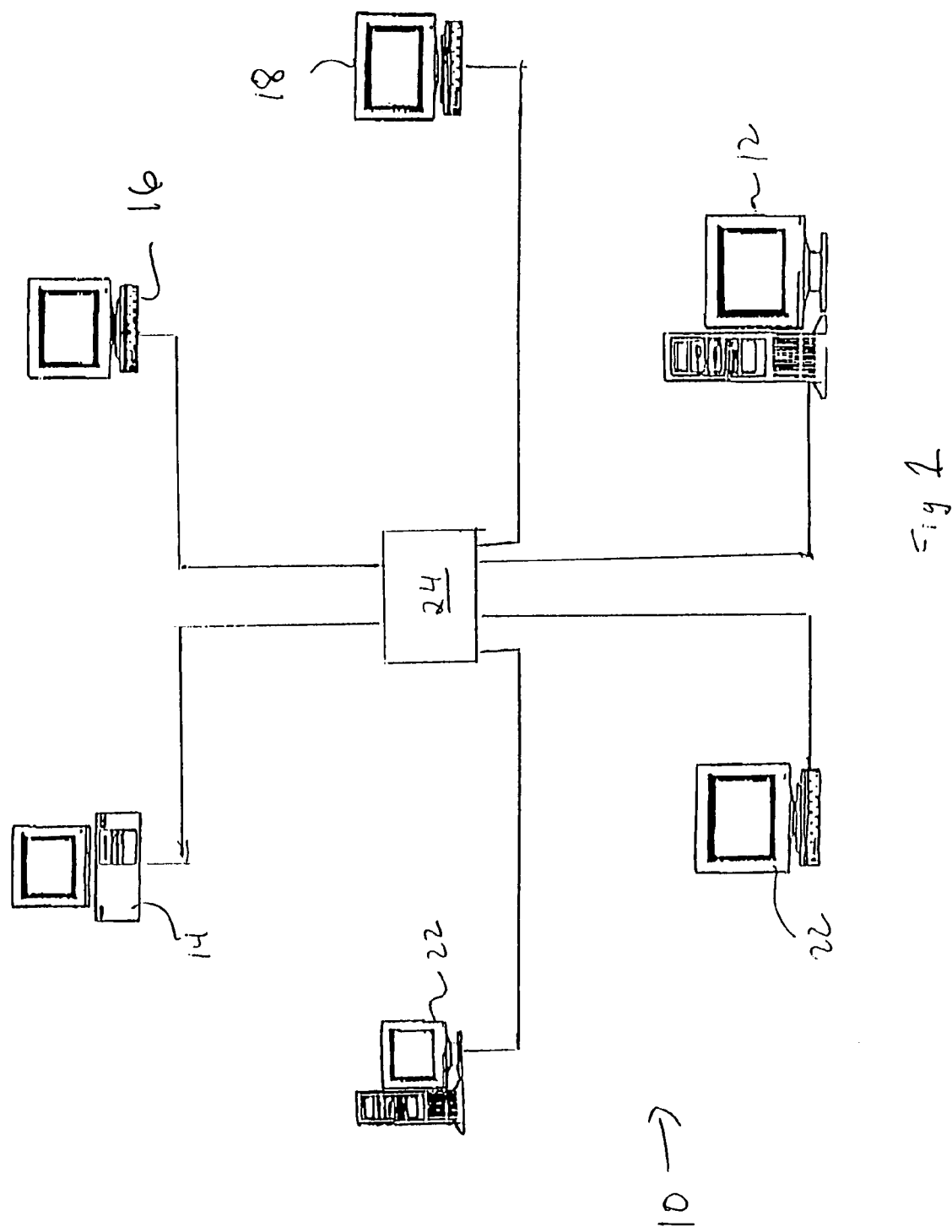
FIG. 1 is a schematic chart of the payment system in accordance with the invention.

As best shown in FIG. 1, a payment administration system 10 for administrating payments for financial obligations includes an administrator 12, a customer terminal 14, a creditor terminal 16, an administrator's bank terminal 18, a customer financial institution terminal 20, and may include a credit bureau terminal 22, all of which communicate electronically. In the preferred embodiment, all of the terminals electronically communicate by the World Wide Web 24. In some applications, the administrator 12 may be integrated into a financial banking system or other institution. Thus, one or more of the computers or terminals may be merged together.

Figure 2:
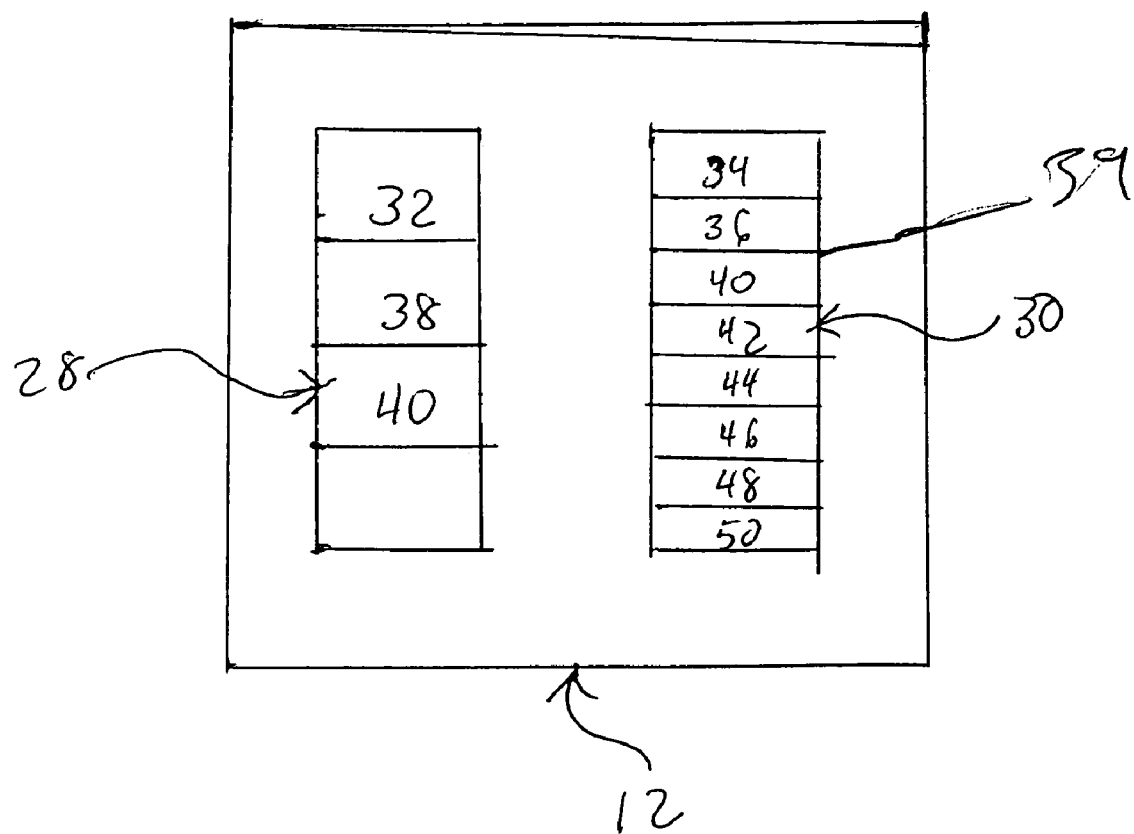
FIG. 2 is a schematic chart of the electronic administrator.

As shown in FIG. 2, the administrator 12 includes a computer 26 having a central database 28 and a number of administrative programs 30 stored in the memory. The database 28 has a customer file 32 for each customer. The customer file 32 has fields containing customer identifying statistics such as the customer's name, address, telephone number, social security number, date of birth, bank or financial account number and other personal information necessary for identification. The customer file 32 also includes a user field, user name and a password for security. The customer file 32 includes fields containing customer selected purchase parameters 33. The purchase parameters 33 permit the customer to select a dollar limit threshold for any single purchase, a dollar limit threshold for all purchases within a single day, a time actuation limit such that the account is active and available for use only during certain time periods, for instance 8:00 a.m. to 5:00 p.m. Monday through Friday. The customer may also limit the use of the account to specific merchants or merchant categories. Merchant categories are defined by standard industry code (SIC). The customer also determines whether the account is a charge or debit account. Finally, and as set forth more fully below, the customer may also select notification options and payment options.

As shown in FIG. 2, the administrative programs 30 include a customer interface 34. In the preferred embodiment, the customer interface 34 is accessed and displayed on the customer terminal 14 electronic device by a link through the World Wide Web 24. The customer interface 34 prompts the customer to enter information required for the customer file 32 into the database 28. The customer interface 34 also prompts the customer to enter payment options 38. The customer enters primary banking or financial account 37 or payment information such as banking or financial account information for a debit card or for automatic withdrawal of payments for a charge account. The customer may elect to have the whole amount of a charge account paid, pay the minimum amount, or to pay a pre-established amount each month. The customer may elect to have the payment amount deducted from the primary financial account 37. The customer may also select a secondary financial account 39 source which is utilized when the primary financial account 37 is unable to make the payment. Thus, if the customers primary financial account 37 balance is too low to cover the payment, the secondary financial account 39, such as a savings or money market account, will be utilized for payment.

Figure 3:
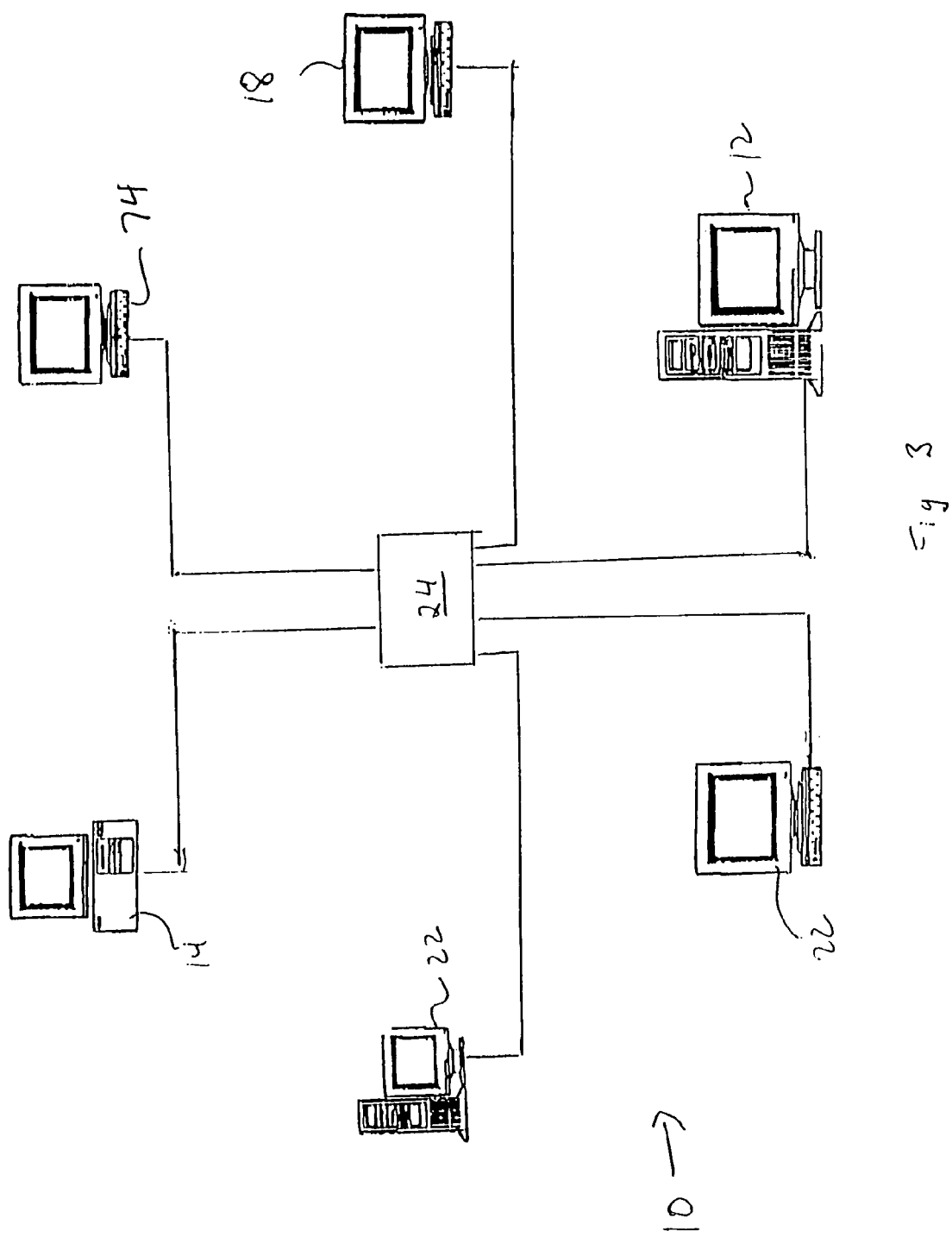
FIG. 3 is a schematic chart showing a purchase made using the administrative system.

As shown in FIGS. 2 and 3, the administrative programs 30 include an account opening program 36 which in the preferred embodiment electronically contacts a credit reporting bureau 22 by the World Wide Web 24 to determine whether the customer is eligible for a credit account. In some cases, phone contact with the credit bureau may needed to obtain the information entered into the customer file 32. The administrator then verifies the banking or financial institution account information provided by the customer by communicating with the customer's financial institution. If possible, this communication is also done electronically. In some cases it may need to be done by phone. If the customer has elected to have a debit account or one of the automatic withdrawal payment plans, the account opening program 36 opens a debit account with the customer's bank or financial institution.

Once all the bank information is verified and/or approved, the account opening program 36 opens a customer account 41 in the database 28 for the customer. An account number, PIN, and expiration date are assigned. This information is then forwarded to the customer by mail. The customer is able to immediately use the account to make purchases with merchants enrolled in the payment administration system 10. If the customer wishes to have the payment administration system 10 handle periodic payments to creditors, or utilities, the customer provides account information and the account opening program establishes debit times and amounts for each payment. A payment program 39 then directs a disbursement to the creditor or utility at the selected time.

The administrative programs 30 include a merchant approval program 50 which accesses information from merchant files 40 contained in the database 28. A file 40 is opened for each merchant enrolled in the program. The merchant file 50 is assigned an account number and a merchant category is assigned. A payment account 43 is also opened and merchant banking information is entered into the file 40. This information may be entered electronically over the World Wide Web by a merchant terminal through a merchant interface 42. Once the account is opened, the merchant is permitted access to the approval program 50. The merchant approval program 50 provides the merchant with authorization for a purchase. The merchant enters the customer's account number into the merchant interface and the approval program 50 queries the database customer files 28 to verify the customer's identity and that the purchase is within the parameters established. This includes the customer's credit limit and any predefined customer selected purchase parameters 33 such as time of day, merchant type, or type of purchase of goods. If the purchase is within the parameters established, approval is given and the transaction amount is posted to the merchant account and the customer's account.

As shown in FIG. 2, the administrative system includes a notification program 44 which provides a real-time notification to the customer electronically, such as by e-mail or wireless communications equipment; notification is made of any account activity, such as a payment or purchase. The customer may select from several notification options through the customer interface 34. The customer may select the frequency of notification. For instance, the customer may select to receive daily or weekly statements by e-mail. These statements will provide a summary of all transactions occurring on the account that day, including purchases, payments, credits, and the like. A customer account interface 46 is provided to permit the customer in real-time to view the status of the account and recent transactions posted to the account. The customer account interface is accessed by the customer terminal from the home page of the administrator. Real-time notification is also sent electronically of any change in account status, such as posting of payments received, clearing of checks, notification that a payment has been refused by a bank or financial institution, or a check has bounced. Additionally, any notification made by the customer, such as address changes and new card issues, will be reflected on the account. Real-time confirmation notices will be delivered to the customer as a result of any such action and the customer can confirm the change through the customer account interface 34.

When the customer is within a predefined percentage, such as 10% of the credit limit, the notification program 44 will be activated to deliver a real-time electronic notice to the customer advising of this fact. Likewise, the program will provide real-time notification of eligibility for increases or decreases in the credit line and/or interest rates. The customer can elect to dispense with some of the notifications, such as daily account summary, or real-time notification. Notification will then be made at periodic intervals selected by the customer.

A collection program 48 is used to transfer funds from the customer's financial institution 20 to the administrator's financial institution 18. If the customer has elected a debit account the customer's financial institution is contacted electronically after posting to debit the customer's financial institution account in the amount of the transaction. If the customer has a charge account, the notification, the collection program is activated at the appropriate time to debit the customer's financial institution account in accordance with the payment options that the customer previously made. If the customer does not have sufficient funds for the transaction in the primary or secondary withdrawal accounts, or if the customer does not make payment, a query by the notification program 44 determines whether payment has been made. If no payment is made, the notification program electronically notifies the customer that payment has not been made and/or the due date has passed.

The administration system 10 thus provides a system which is responsive to customer set parameters, both for purchases and payments, provides for real-time notification and flexibility. In one embodiment, the system can be used as a paperless payment administration system which is readily suitable for use in World Wide Web transactions. such a system permits customers to set the purchase parameters, establish security measures to prevent undesired or authorized purchases by household or family members, and provides real-time paperless notification of the status of each transaction.

Another feature of the program permits a client to establish an account that may be used with minors within predefined limits established by the parent.

Figure 4:
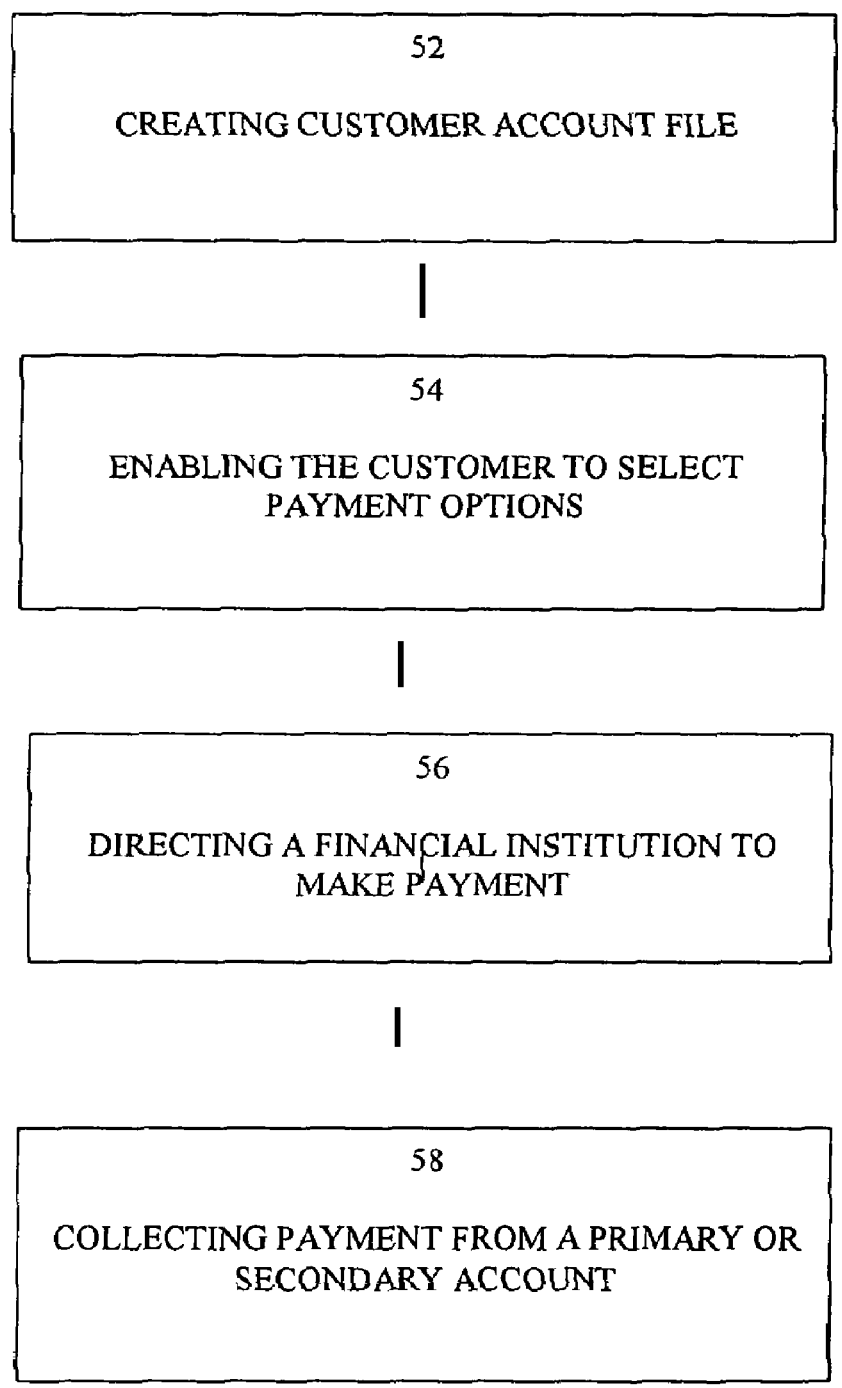
FIG. 4 is a flow chart showing the method of administrating payments in accordance with the invention.

As shown in FIG. 4, a preferred method 50 of administering payments utilizing the elements set forth above, the method includes the steps of creating 52 a customer account 41 in the central database 18, enabling 54 a customer to select payment options 38 through a customer interface 34 electronically communicating with the central database, directing 56 a financial institution to make payment for customer obligation to the creditor in accordance with customer selected payment options 38. The payment options 38 are selected through the customer interface between the administrator and customer, enabling the customer to enter predetermined payment options 38 into the customer database through the customer interface 34, and collecting 58 payment electronically from a primary or secondary account in accordance with the payment options 38. The payment options 38 include permitting the customer to select a primary and secondary financial account for making payment. In the event that the primary account is unable to make payment, a message signal, such as a refusal of the payment request by the financial institution administering the primary account, and a program then instructs the secondary account to make payment.

A first preferred alternative method 60 of administering payments provides real-time notification for an account status is shown in FIG. 5. The method 60 includes creating 52 a customer account file 32 in a central database 28 which is remote from the customer's home or place of business, a plurality of client files and an account for each customer. The method 60 further includes providing 62 an electronic communication link or customer interface 34 between the administrator 12 and a customer electronic device and electronically notifying 66 the customer of any change in the account status.

Figure 6:
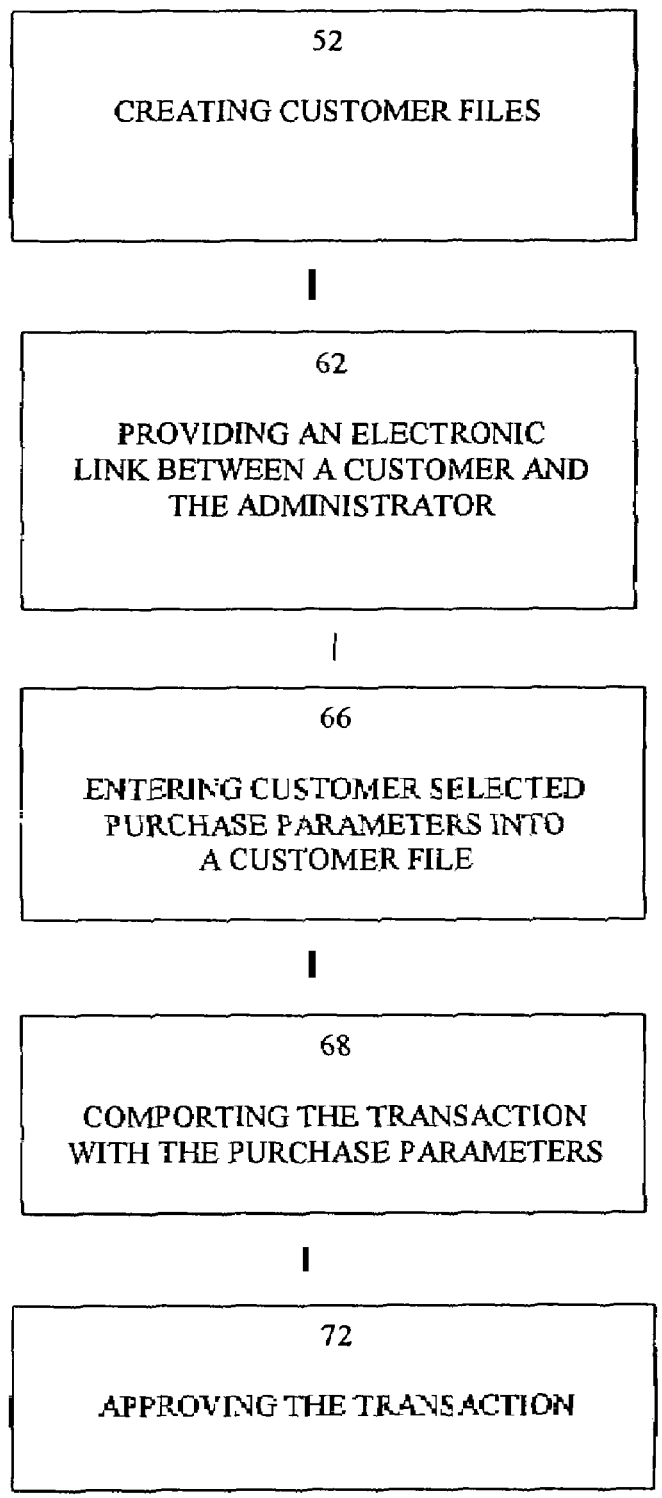
FIG. 6 is a flow chart showing a second alternative preferred method of administrating payments in accordance with the invention.

As shown in FIG. 6, a second alternative method 70 of administrating payments is particularly useful for making on-line purchases from a merchant 74 or service provider as shown in FIG. 3. The method includes providing the customer selected purchase parameters 33. As set forth above, the method 50 includes creating 52 customer files 32 in the central database 28, providing 62 the customer interface between the administrator 12 and the customer terminal 14, entering 66 a customer selected purchase parameters 33 from the customer terminal, and entering the purchase parameters 33 into the customer file 32, comparing 68 the transaction with the purchase options 33 and approving 72 the transaction if the transaction falls within the preselected customer purchase options 33 and the administrative credit limits. The administrator then makes payment to the merchant 74 as made to the creditor as discussed above in the preferred method 50 of administering payments.

Variations in the system and methodologies may occur to those skilled in the art upon reviewing the subject matter of this disclosure. Such variations, if within the spirit of the real invention, are intended to encompassed by the scope of the claims appended hereto. The description of the preferred embodiment herein is meant for illustrative purposes only, and not to be interpreted as limiting the scope of the invention.

We claim:

1. An administration apparatus for directing payments financial obligations of a customer that is a consumer of goods or services, the apparatus comprising:
   an administrator having a database and an administrative program, the database including a customer file, the customer file including a purchase parameter, the purchase parameter being predefined by the customer, the administrative program including a merchant approval program and a collection program, the merchant approval program being operable to query the customer in response to approval request wherein the purchase parameter comprises a customer dollar limit threshold for all purchases within a predetermined period of time.

2. The administration apparatus of claim 1, wherein the customer file further comprises a customer identifying statistic.

3. The administration apparatus of claim 2, wherein the customer identifying statistic is selected from a group consisting of customer, name, customer address, customer telephone number, customer social security number, customer date of birth and customer bank account number.

4. The administration apparatus of claim 1, wherein the purchase parameter comprises a customer dollar limit threshold for a purchase.

5. The administration apparatus of claim 1, wherein the database further comprises a merchant file.

6. The administration apparatus of claim 5, wherein the merchant file includes a merchant category.

7. The administration apparatus of claim 1, wherein the customer file includes a payment option.

8. The administration apparatus of claim 1, wherein the administrative program further comprises an account opening program.

9. The administration apparatus of claim 1, wherein the administrative program further comprises a notification program.

10. The administration apparatus of claim 1, wherein the administrative program further comprises a customer account interface.

11. A method of administering payments for transactions made by a customer that is a consumer of goods or services from a merchant, the method comprising:

proviking an administrator:

creating a database in electronic communication with the administrator having a customer file and a merchant file, the customer file including a purchase parameter, the merchant file having a merchant account number and a merchant category assigned thereto, the purchase parameter including a value predetermined by the customer;

creating an administrative program in electronic communication with the administrator and having a merchant approval program, the merchant approval program being operable to query the purchase parameters in response to a transaction approval request;

transmitting a transaction approval request from the merchant approval program to the customer file to query the purchase parameter;

receiving at the merchant approval program a transaction approval request;

transmitting an approval of the transaction approval request when the request falls within the purchase parameter, wherein the purchase parameter comprises a customer dollar limit threshold for all purchases within a predetermined period of time.

12. The method of claim 11, wherein the purchase parameter comprises a customer dollar limit threshold for a purchase.

13. The method of claim 11, further comprising the step of transmitting an electronic notice in real time to a customer.

\* \* \* \* \*

UNITED STATES PATENT AND TRADEMARK OFFICE
CERTIFICATE OF CORRECTION

PATENT NO. : 7,653,597 B1  Page 1 of 1
APPLICATION NO. : 09/614109
DATED : January 26, 2010
INVENTOR(S) : Stevanovski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1798 days.

Signed and Sealed this

Twenty-third Day of November, 2010

David J. Kappos
*Director of the United States Patent and Trademark Office*